(12) United States Patent
Shaburov et al.

(10) Patent No.: US 11,394,888 B2
(45) Date of Patent: Jul. 19, 2022

(54) PERSONALIZED VIDEOS

(71) Applicant: SNAP INC., Santa Monica, CA (US)

(72) Inventors: Victor Shaburov, Ocean Village (GI); Alexander Mashrabov, Sochi (RU); Grigoriy Tkachenko, Sochi (RU); Ivan Semenov, Astrakhan (RU)

(73) Assignee: Snap Inc., Santa Monica, CA (US)

( * ) Notice: Subject to any disclaimer, the term of this patent is extended or adjusted under 35 U.S.C. 154(b) by 141 days.

(21) Appl. No.: 16/594,771

(22) Filed: Oct. 7, 2019

(65) Prior Publication Data
US 2020/0236297 A1    Jul. 23, 2020

Related U.S. Application Data

(63) Continuation-in-part of application No. 16/251,436, filed on Jan. 18, 2019, now Pat. No. 10,789,453.

(51) Int. Cl.
| | |
|---|---|
| *H04N 5/232* | (2006.01) |
| *H04N 5/265* | (2006.01) |
| *H04N 5/272* | (2006.01) |
| *G06V 40/16* | (2022.01) |

(52) U.S. Cl.
CPC ..... *H04N 5/232945* (2018.08); *G06V 40/176* (2022.01); *H04N 5/23219* (2013.01); *H04N 5/232935* (2018.08); *H04N 5/265* (2013.01); *H04N 5/272* (2013.01)

(58) Field of Classification Search
CPC .. G06K 9/00228; G06K 9/00302; G06N 3/04; G06Q 30/0254; G06Q 30/0269; G06T 11/001
See application file for complete search history.

(56) References Cited

U.S. PATENT DOCUMENTS

| | | | |
|---|---|---|---|
| 2016/0078280 A1* | 3/2016 | Tai | G06T 13/80 382/118 |
| 2018/0182141 A1* | 6/2018 | Caballero | G06T 11/00 |

FOREIGN PATENT DOCUMENTS

WO    2018102880 A1    6/2018

OTHER PUBLICATIONS

Garrido et al: "Automatic Face Reenactment", IEEE, 2014 (Year: 2014).*

(Continued)

*Primary Examiner* — Ruiping Li
(74) *Attorney, Agent, or Firm* — Georgiy L. Khayet

(57) ABSTRACT

Disclosed are systems and methods for providing personalized videos. An example method includes storing one or more preprocessed videos. The one or more preprocessed videos may include at least one frame with at least a target face. The method may continue with receiving an image of a source face, for example, by receiving a user selection of a further image and segmenting the further image into portions including the source face and a background. The method may then proceed with modifying the one or more preprocessed videos to generate one or more personalized videos. The modification may include modifying the image of the source face to generate an image of a modified source face. The modified source face may adopt a facial expression of the target face. The modification may further include replacing the at least one target face with the image of the modified source face.

20 Claims, 14 Drawing Sheets

(56) References Cited

OTHER PUBLICATIONS

Pablo Garrido et al: "Automatic Face Reenactment", arxiv.org, Cornell University Library, 201 Olin Library Cornell University Ithaca, NY 14853, Feb. 8, 2016 (Feb. 8, 2016), XP080682208, DOI: 10.1109/CVPR.2014.537 the whole document.
Jiahao Geng et al: "Warp-guided GANs for single-photo facial animation", Dec. 4, 2018; 1077952576-1077952576, Dec. 4, 2018 (Dec. 4, 2018). pp. 1-12, XP058422618, DOI: 10.1145/3272127. 3275043, ISBN: 978-1-4503-6008-1, abstract section 1 "introduction", paragraph 3, p. 2 section 3 "overview", p. 3 section 4 "the method", paragraphs 1 to 3, pp. 3 to 4 section 4.1 "refining warped face with wg-GAN", paragraphs 1 to 5, pp. 4 to 5 section 4.2 "hidden rehion hallucination with hrh-GAN", p. 6 section 5 "experimental results", p. 6 section 5.4.

* cited by examiner

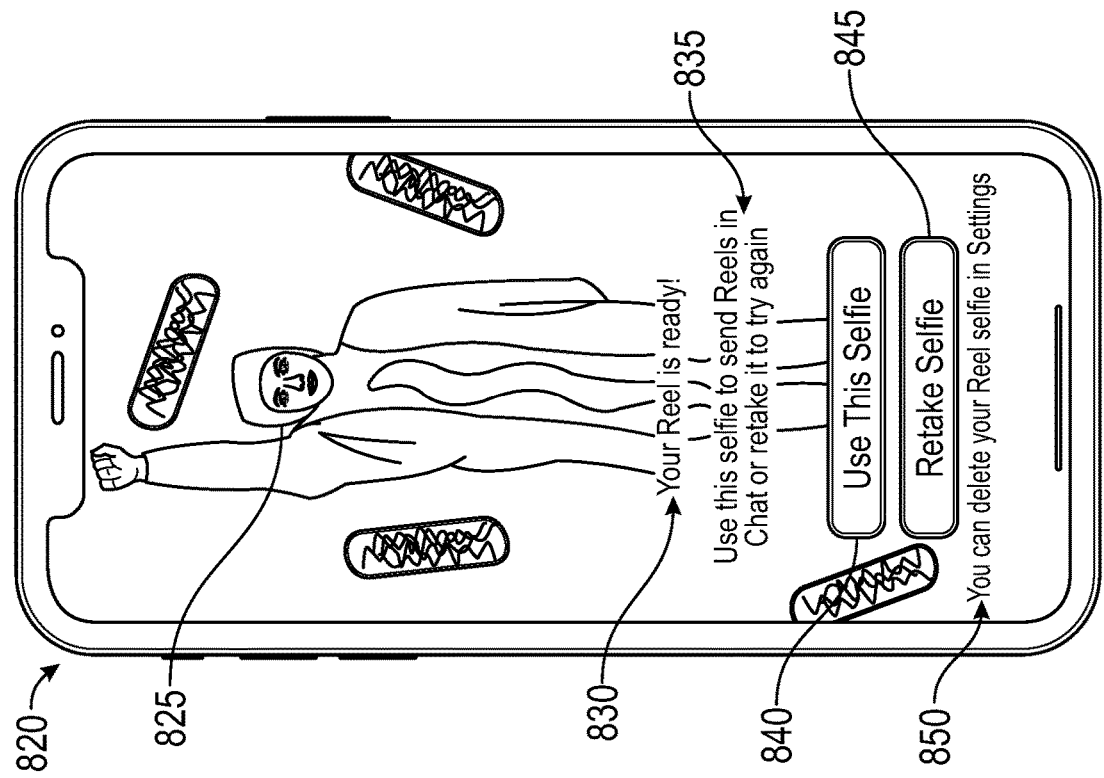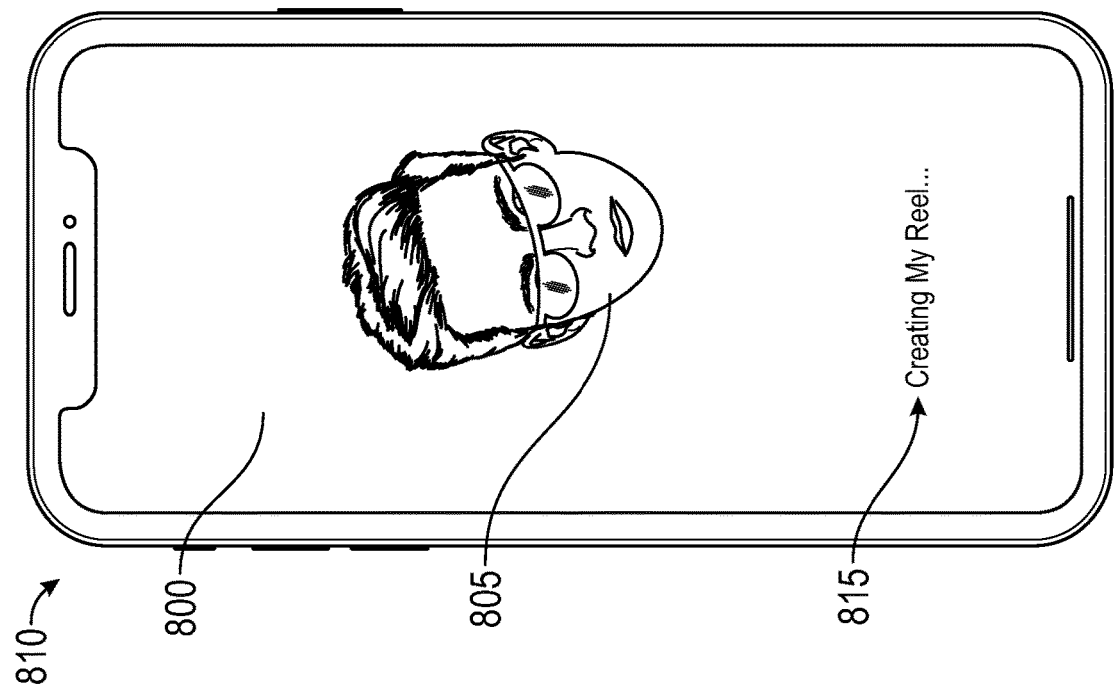
FIG. 8

PERSONALIZED VIDEOS

CROSS-REFERENCE TO RELATED APPLICATION

This application is a Continuation-in-part of U.S. patent application Ser. No. 16/251,436, entitled "Systems and Methods for Face Reenactment," filed on Jan. 18, 2019. The aforementioned application is incorporated herein by reference in its entirety for all purposes.

TECHNICAL FIELD

This disclosure generally relates to digital image processing. More particularly, this disclosure relates to methods and systems for providing personalized videos.

BACKGROUND

Sharing media, such as stickers and emojis, has become a standard option in messaging applications (also referred herein to as messengers). Currently, some of the messengers provide users with an option for generating and sending images and short videos to other users via a communication chat. Certain existing messengers allow users to modify the short videos prior to transmission. However, the modifications of the short videos provided by the existing messengers are limited to visualization effects, filters, and texts. The users of the current messengers cannot perform complex editing, such as, for example, replace one face with another face. Such editing of the videos is not provided by current messengers and requires sophisticated third-party video editing software.

SUMMARY

This section is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

According to one embodiments of the disclosure, a system for providing personalized videos is disclosed. The system may include at least one processor and a memory storing processor-executable codes. The processor may be configured to store, in a memory of a computing device, one or more preprocessed videos. The one or more preprocessed videos may include at least one frame with at least a target face. The processor may be configured to receive an image of a source face. The image of the source face can be received as a user selection of a further image from a set of images stored in the memory. The further image can be segmented into portions including the source face and a background. In a further example embodiment, the image of the source face may be received by capturing, by a camera of the computing device, a further image and segmenting the further image into portions including the source face and a background. Prior to capturing the further image, the processor may display, via a graphical display system of the computing device, the further image and guide the user to position the face in the further image within a pre-determined area of the screen.

The processor may be configured to modify the one or more preprocessed videos to generate one or more personalized videos. The modifying of the one or more preprocessed videos may be performed by modifying the image of the source face to adopt a facial expression of the target face. The modifying of the one or more preprocessed videos may further include replacing the at least one target face with the image of the modified source face.

Prior to modifying the image of the source face, the processor may determine, based on the at least one frame, target facial expression parameters associated with a parametric face model. In this embodiment, the modifying of the image of the source face may include determining, based on the image of the source face, source parameters associated with the parametrical face model. The source parameters may include source facial expression parameters, source facial identity parameters, and source facial texture parameters. The modifying of the image of the source face may further include synthesizing the image of the modified source face based on the parametrical face model and target facial expression parameters, source facial identity parameters, and source facial texture parameters.

The processor may be further configured to receive a further image of a further source and modify, based on the further image, the one or more preprocessed videos to generate the one or more further personalized videos. The processor may be further configured to enable a communication chat between a user and at least one further user of at least one remote computing device, receive a user selection of a video from the one or more personalized videos, and send the selected video to at least one further user via the communication chat.

The processor may be further configured to display the selected video in a window of the communication chat. The selected video may be displayed in a collapsed mode. Upon receiving an indication that the user has tapped the selected video in the window of the communication chat, the processor may display the selected video in a full screen mode. The processor may be further configured to mute sound associated with the selected video while displaying the selected video in the collapsed mode and play back the sound associated with the selected video while displaying the selected video in the full screen mode.

According to one example embodiment, a method for providing personalized videos is disclosed. The method may include storing, by a computing device, one or more preprocessed videos. The one or more preprocessed videos may include at least one frame with at least a target face. The method may then continue with receiving, by the computing device, an image of a source face. The image of the source face may be received as a user selection of a further image from a set of images stored in a memory of the computing device and segmenting the further image into portions including the source face and a background. In a further example embodiment, the image of the source face may be received by capturing, by a camera of the computing device, a further image and segmenting the further image into portions including the source face and a background. Prior to capturing the further image, the further image can be displayed via a graphical display system of the computing device and the user may be guided to position an image of a face with the further image within a pre-determined area of the graphical display system.

The method may further include modifying, by the computing device, the one or more preprocessed videos to generate one or more personalized videos. The modification may include modifying the image of the source face to generate an image of a modified source face. The modified source face may adopt a facial expression of the target face. The modification may further include replacing the at least one target face with the image of the modified source face. The method may further include receiving, by the computing device, a further image of a further source face and modifying, by the computing device and based on the further image, the one or more preprocessed videos to generate the one or more further personalized videos.

The method may further include enabling, by the computing device, a communication chat between a user of the computing device and at least one further user of at least one further computing device, receiving, by the computing device, a user selection of a video from the one or more personalized videos, and sending, by the computing device, the selected video to at least one further user via the communication chat. The method may continue with displaying, by the computing device, the selected video in a window of the communication chat in a collapsed mode. Upon receiving, by the computing device, an indication that the user has tapped the selected video in the window of the communication chat, the selected video may be displayed in a full screen mode. The method may include muting sound associated with the selected video while displaying the selected video in the collapsed mode and playing back the sound associated with the selected video while displaying the selected video in the full screen mode.

The method may further include determining, prior to modifying the image of the source face and based on the at least one frame, target facial expression parameters associated with a parametric face model. The at least one frame may include metadata, such as the target facial expression parameters. In this embodiment, the modification of the image of the source face may include determining, based on the image of the source face, source parameters associated with the parametrical face model. The source parameters may include source facial expression parameters, source facial identity parameters, and source facial texture parameters. The modification of the image of the source face may further include synthesizing the image of the modified source face based on the parametrical face model and the target facial expression parameters, the source facial identity parameters, and the source facial texture parameters.

According to yet another aspect of the disclosure, there is provided a non-transitory processor-readable medium, which stores processor-readable instructions. When the processor-readable instructions are executed by a processor, they cause the processor to implement the above-mentioned method for providing personalized videos.

Additional objects, advantages, and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

Embodiments are illustrated by way of example and not limitation in the figures of the accompanying drawings, in which like references indicate similar elements.

FIGS. 6-11 show screens of a user interface of a system for providing personalized videos in a messenger, according to some example embodiments.

DETAILED DESCRIPTION

Figure 1:
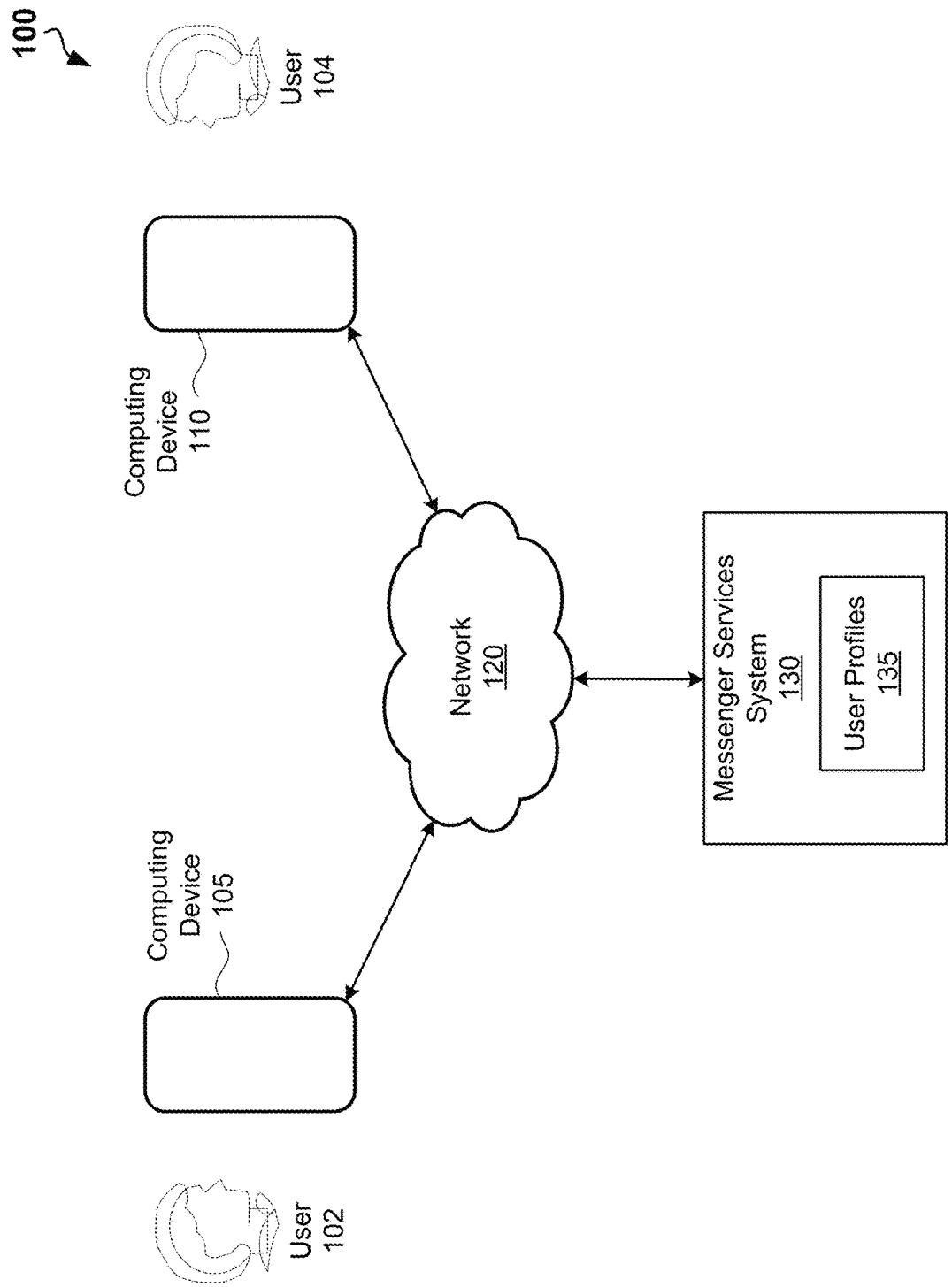
FIG. 1 is a block diagram showing an example environment wherein a system and method for providing personalized videos can be implemented.

The following detailed description of embodiments includes references to the accompanying drawings, which form a part of the detailed description. Approaches described in this section are not prior art to the claims and are not admitted prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

For purposes of this patent document, the terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to."

This disclosure relates to methods and systems for providing personalized videos. The embodiments provided in this disclosure solve at least some issues of known art. The present disclosure can be designed to work on mobile devices, such as smartphones, tablet computers, or mobile phones, in real-time, although the embodiments can be extended to approaches involving a web service or a cloud-based resource. Methods described herein can be implemented by software running on a computer system and/or by hardware utilizing either a combination of microprocessors or other specifically designed application-specific integrated circuits (ASICs), programmable logic devices, or any combinations thereof. In particular, the methods described herein can be implemented by a series of computer-executable instructions residing on a non-transitory storage medium such as a disk drive or computer-readable medium.

Some embodiments of the disclosure may allow generating personalized videos in a real time on a user computing device, such as a smartphone. The personalized videos can be generated based on pre-generated videos, for example videos featuring an actor. Certain embodiments of the present disclosure may allow replacing the face of the actor in the pre-generated videos with the face of the user or another person to generate personalized video. While replacing the face of the actor with the face of the user or another person, the face of the user of another person is modified to adopt facial expression of the actor. The personalized videos can be generated within a communication chat between the user and a further user of the further computing device. The user may select and send one or more of the personalized videos to the further user via the communication chat. The personalized video can be indexed and searchable based on pre-defined keywords associated with templates of a preprocessed video, which are used to insert an image of the face of the user to generate the personalized videos. The personalized video can be ranked and categorized based on sentiment and actions featured in the videos.

According to one embodiment of the disclosure, an example method for providing personalized video may include storing, by a computing device, one or more preprocessed videos. The one or more preprocessed videos may include at least one frame having at least a target face. The method may further include enabling a communication chat between a user and at least one further user of at least one remote computing device. The computing device may receive an image of a source face and modify the one or more preprocessed videos to generate one or more personalized videos. The modification may include modifying the image of the source face to generate an image of a modified source face. The modified source face may adopt a facial expression of the target face. The modification may further include replacing the at least one target face with the image of the modified source face. Upon the modification, a user selection of a video from the one or more personalized videos may be received and the selected video may be sent to at least one further user via the communication chat.

Referring now to the drawings, example embodiments are described. The drawings are schematic illustrations of idealized example embodiments. Thus, the example embodiments discussed herein should not be understood as limited to the particular illustrations presented herein, rather these example embodiments can include deviations and differ from the illustrations presented herein as shall be evident to those skilled in the art.

FIG. 1 shows an example environment 100, wherein a method for providing personalized videos can be practiced. The environment 100 may include a computing device 105, a user 102, a computing device 110, a user 104, a network 120, and messenger services system 130. The computing device 105 and computing device 110 can refer to a mobile device such as a mobile phone, smartphone, or tablet computer. In further embodiments, however, the computing device 110 can refer to a personal computer, laptop computer, netbook, set top box, television device, multimedia device, personal digital assistant, game console, entertainment system, infotainment system, vehicle computer, or any other computing device.

The computing device 105 and the computer device 110 can be communicatively connected to messenger services system 130 via the network 120. The messenger services system 130 can be implemented as a cloud-based computing resource(s). The messenger services system can include computing resource(s) (hardware and software) available at a remote location and accessible over a network (e.g., the Internet). The cloud-based computing resource(s) can be shared by multiple users and can be dynamically re-allocated based on demand. The cloud-based computing resources can include one or more server farms/clusters including a collection of computer servers which can be co-located with network switches and/or routers.

The network 120 may include any wired, wireless, or optical networks including, for example, the Internet, intranet, local area network (LAN), Personal Area Network (PAN), Wide Area Network (WAN), Virtual Private Network (VPN), cellular phone networks (e.g., Global System for Mobile (GSM) communications network, and so forth.

In some embodiments of the disclosure, the computing device 105 can be configured to enable a communication chat between the user 102 and the user 104 of the computing 110. During the communication chat the user 102 and the user 104 may exchange text message and videos. The videos may include personalized videos. The personalized videos can be generated based on pre-generated videos stored in the computing device 105 or the computing device 110. In some embodiments, the pre-generated videos can be stored in the messenger services system 130 and downloaded to the computing device 105 or the computing device 110 on demand.

The messenger services system 130 may be also configured to store user profiles. The user profiles may include images of the face of the user 102, images of the face of the user 104, and images of faces of other persons. The images of the faces can be downloaded to the computing device 105 or the computing device 110 on demand and based on permissions. Additionally, the images of the face of the user 102 can be generated using the computing device 105 and stored in a local memory of the computing device 105. The images of the faces can be generated based on other images stored in the computing device 105. The images of the faces can be further used by the computing device 105 to generate personalized videos based on the pre-generated videos. Similarly, the computing device 110 may be used to generate images of the face of the user 104. The images of the face of the user 104 can be used to generate personalized videos on the computing device 110. In further embodiments, the images of the face of user 102 and images of the face of the user 104 can be mutually used to generate personalized videos on the computing device 105 or the computing device 110.

Figure 2:
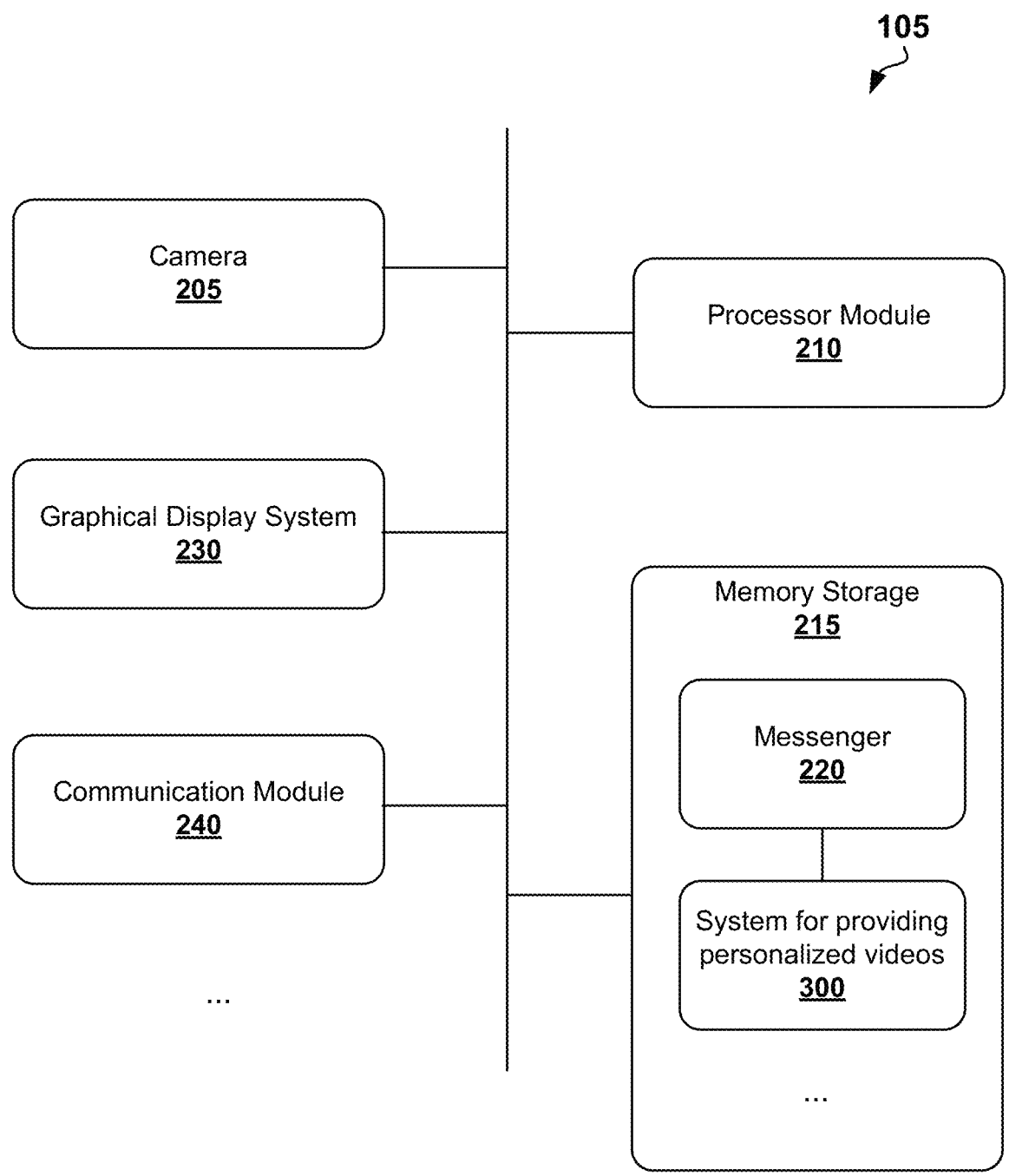
FIG. 2 is a block diagram showing an example embodiment of a computing device for implementing methods for providing personalized videos.

FIG. 2 is a block diagram showing an example embodiment of a computing device 105 (or computing device 110) for implementing methods for personalized videos. In the example shown in FIG. 2, the computing device 110 includes both hardware components and software components. Particularly, the computing device 110 includes the camera 205 or any other image-capturing device or scanner to acquire digital images. The computing device 110 can further include a processor module 210 and a storage module 215 for storing software components and processor-readable (machine-readable) instructions or codes, which when performed by the processor module 210, cause the computing device 105 to perform at least some steps of methods for providing personalized videos as described herein. The computing device 105 may include graphical display system 230 and a communication module 240. In other embodiments, the computing device 105 may include additional or different components. Moreover, the computing device 105 can include fewer components that perform functions similar or equivalent to those depicted in FIG. 2.

The computing device 110 can further include a messenger 220 for enabling communication chats with another computing device (such as the computing device 110) and a system 300 for providing personalized videos. The system 300 is described in more detail below with reference to FIG.

3. The messenger 220 and the system 300 may be implemented as software components and processor-readable (machine-readable) instructions or codes stored in the memory storage 215, which when performed by the processor module 210, cause the computing device 105 to perform at least some steps of methods for providing communication chats and personalized videos as described herein.

In some embodiments, the system 300 for providing personalized videos can be integrated in the messenger 300. A user interface of the messenger 220 and the system 300 for providing the personalized videos can be provided via the graphical display system 230. The communication chats can be enabled via the communication module 240 and the network 120. The communication module 240 may include a GSM module, a WiFi module, a Bluetooth™ module and so forth.

Figure 3:
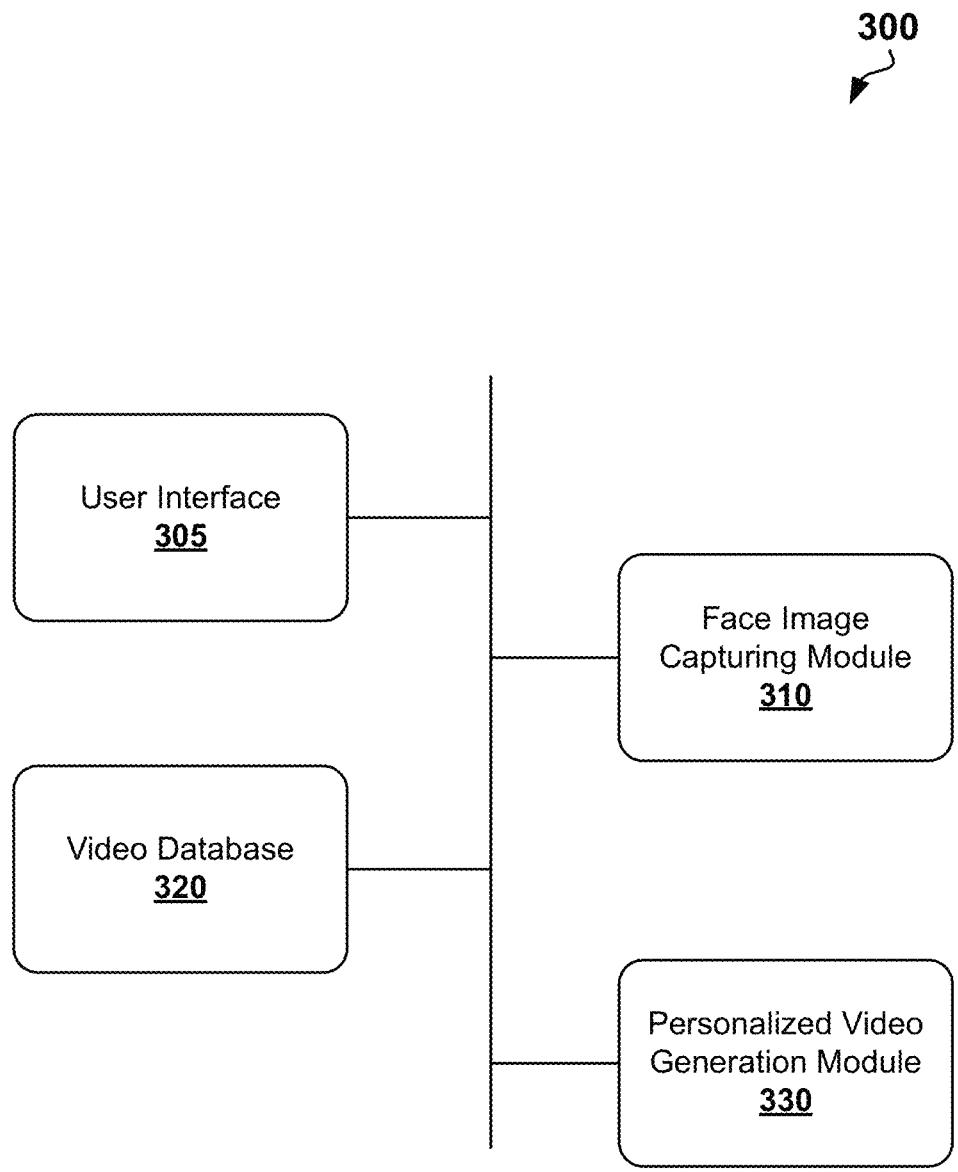
FIG. 3 is a block diagram showing a system for providing personalized videos, according to some example embodiment of the disclosure.

FIG. 3 is a block diagram of a system 300 for providing personalized videos, according to some example embodiment of the disclosure. The system 300 may include a user interface 305, a face image capturing module 310, a video database 320, and a personalized video generation module 330.

The video database 320 may store one or more videos. The videos can include previously recorded videos featuring an actor or multiple actors. The videos may include 2D videos or 3D scenes. The videos can be pre-processed to segment the actor's face (also referred to as a target face) and background in each frame and to identify a set of parameters that can be used for further insertion of a source face instead of the face of the actor (the target face). The set of parameters can include a face texture, facial expression parameters, face color, facial identity parameters, position and angle of the face, and so forth. The set of parameters may also include a list of manipulations and operations that can be carried out on the actor's face such as the replacement of the actor's face performed in a photo-realistic manner.

The face image capturing module 320 can receive an image of a person and generate an image of the face of the person. The image of the face of the person can be used as a source face to replace target face in the videos stored in the video database 320. The image of the person can be captured by the camera 205 of the computing device 105. The image of the person can include an image stored in the memory storage 215 of the computing device 105. Details for the face image capturing module 320 are provided in FIG. 7.

Figure 4:
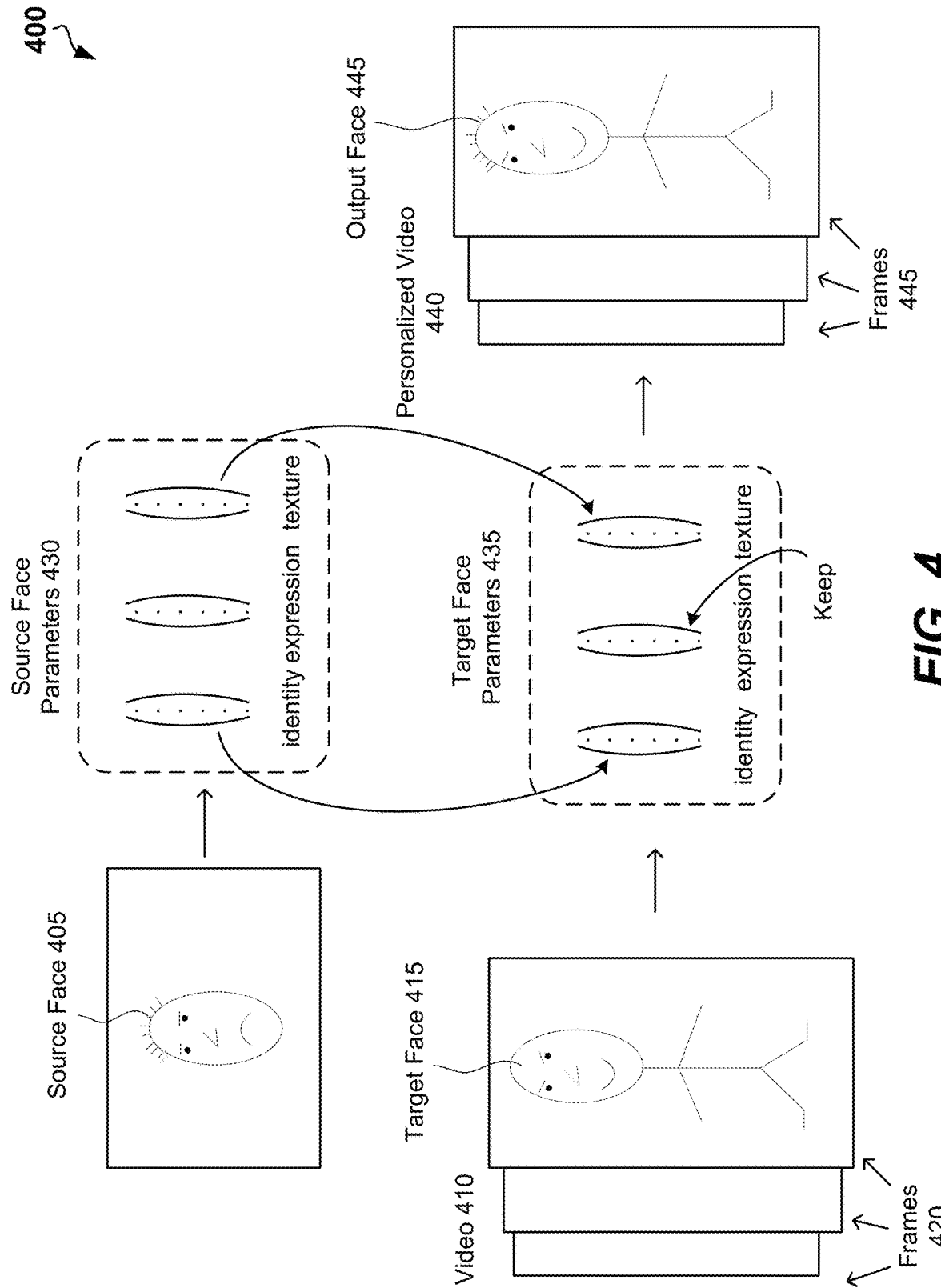
FIG. 4 is a schematic showing a process of generation of a personalized video, according to an example embodiment.

The personalized video generation module 330 can generate, based on an image of the source face, a personalized video from one or more pre-generated videos stored in database 320. The module 330 may replace the face of the actor in a pre-generated video with the source face while keeping the facial expression of the face of the actor. The module 330 may replace a face texture, face color, and facial identity of the actor with a face texture, face color, and facial identity of the source face. The module 330 may also add an image of glasses over eye region of the source face in the personalized video. Similarly, the module 330 may add an image of a headwear (for example, a cap, a hat, a helmet, and so forth) over head of the source face in the personalized video. The image(s) of the glasses and headwear can be pre-stored in the computing device 105 of the user or generated. The images of the glasses and headwear can be generated using a DNN. The module 330 may also apply a shade or a color to the source face of in the personalized video. For example, the module 330 may add suntan to the face of the source face FIG. 4 is a schematic showing functionality 400 of the personalized video generation module 330, according to some example embodiments. The personalized video generation module 330 may receive an image of a source face 405 and a pre-generated video 410. The pre-generated video 410 may include one or more frames 420. The frames 420 may include a target face 415. The facial expression of the source face 405 can be different from the facial expression of target face 415.

In some embodiments of the disclosure, the personalized video generation module 330 can be configured to analyze the image of the source face 405 to extract source face parameters 430. The source face parameters 430 can be extracted by fitting a parametric face model to the image of the source face 405. The parametric face model may include a template mesh. Coordinates of vertices in the template mesh may depend on two parameters: a facial identity and a facial expression. Thus, the source parameters 430 may include a facial identity and facial expression corresponding to the source face 405. The source parameters 405 may further include a texture of the source face 405. The texture may include colors at vertices in the template mesh. In some embodiments, a texture model associated with the template mesh can be used to determine the texture of the source face 405.

In some embodiments of the disclosure, the personalized video generation module 330 can be configured to analyze the frames 420 of the target video 410 to extract target face parameters 335 for each of the frames 420. The target face parameters 435 can be extracted by fitting the parametric face model to the target face 415. The target parameters 435 may include facial identity and facial expression corresponding to the target face 415. The target face parameters 430 may further include texture of the target face 420. The texture of the target face 415 can be obtained using the texture model. In some embodiments of the present disclosure, each of the frames 420 may include metadata. The metadata may include the target face parameters determined for the frame. For example, the target face parameters can be determined by the messenger services system 130 (shown in FIG. 1). The target face parameters can be stored in metadata of the frames of the pre-generated video 410. The pre-generated video can be further downloaded to the computing device 105 and stored in video database 320. Alternatively, the personalized video generation module 330 can pre-process the pre-generated video 410 to determine the target face parameters 435 and location parameters of the target face 415 in the frames 420. The personalized video generation module 330 may further store the target face parameters 435 and location parameters of the target face in the metadata of the corresponding frames 420. This way, the target face parameters 435 are not recomputed each time the pre-generated video 410 is selected for personalization with different source faces.

In some embodiments of the disclosure, the personalized video generation module 330 can be further configured to replace the facial expression in source face parameters 430 with the facial expression from the target parameters 435. The personalized video generation module 330 can be further configured to synthesize an output face 445 using the parametric face model, texture module, and target parameters 430 with the replaced facial expression. The output face 435 can be used to replace the target face 415 in frame of the target video 410 to obtain frames 445 of an output video shown as personalized video 440. The output face 435 is the source face 405 adopting the facial expression of the target face 415. The output video is the personalized video 440 generated based on the pre-determined video 410 and the image of the source face 405.

Figure 5:
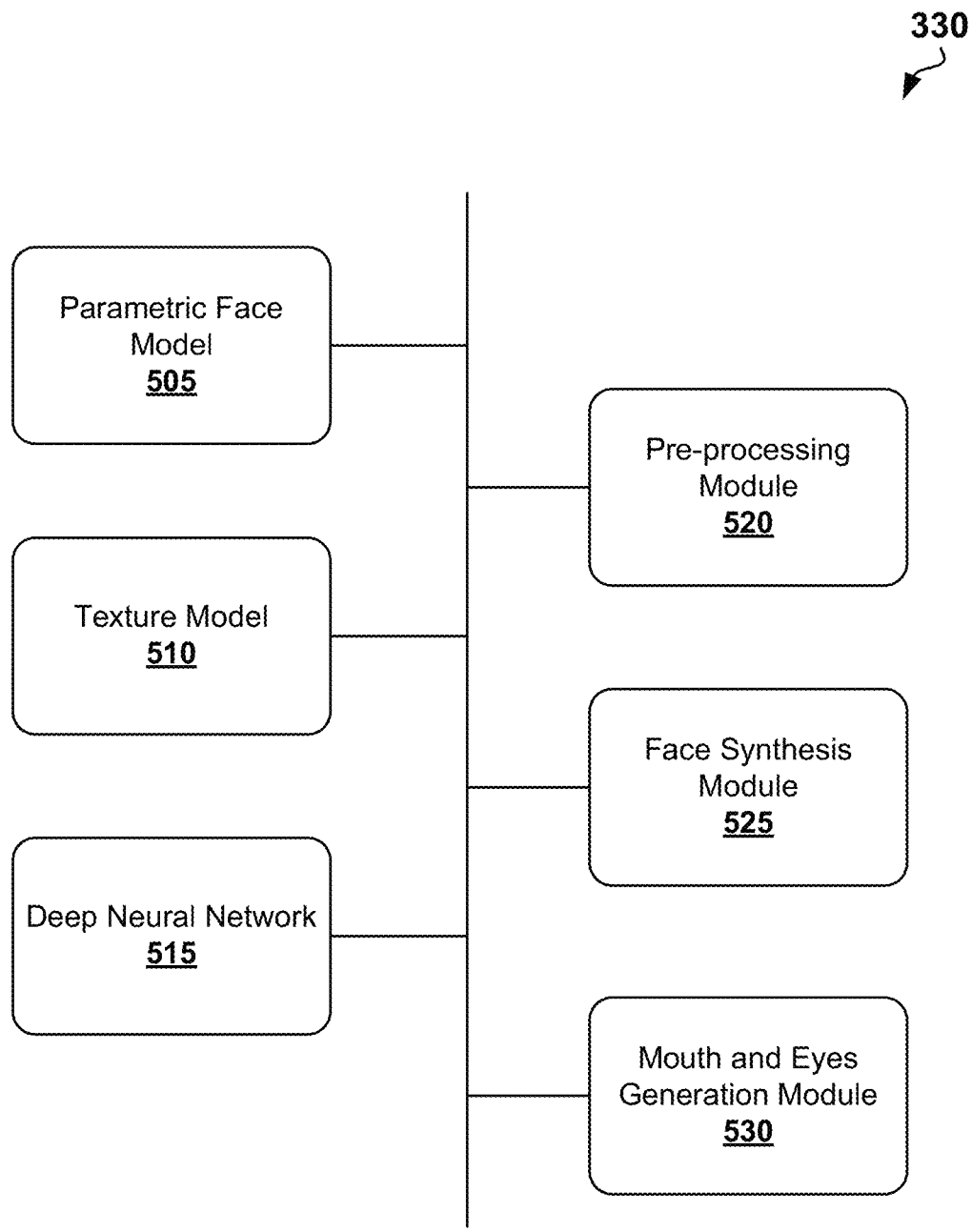
FIG. 5 is a block diagram of a personalized video generation module, according to some example embodiment of the disclosure.

FIG. 5 is a block diagram of the personalized video generation module 330, according to one example embodiment. The personalized video generation module 330 can include a parametric face model 505, a texture model 510, a DNN 515, a pre-processing module 520, a parameter extracting module 525, a face synthesis module 525 and a mouth and eyes generation module 530. The modules 505-530 can be implemented as software components for use with hardware devices such as computing device 105, the computing device 110, the messenger services system 130, and the like.

In some embodiments of the disclosure, the parametric face model 505 can be pre-generated based on images of a pre-defined number of individuals of different age, gender, and ethnic background. For each individual, the images may include an image of the individual having a neutral facial expression and one or more images of the individual having different facial expressions. The facial expression may include open mouth, smile, anger, astonishment, and so forth.

The parametric face model 505 may include a template mesh with a pre-determined number of vertices. The template mesh may be represented as a 3D triangulation defining a shape of a head. Each individual can be associated with an individual-specific blend shape. The individual-specific blend shape can be adjusted to the template mesh. The individual-specific blend shape can correspond to specific coordinates of vertices in the template mesh. Thus, different images of individuals can correspond to the template mesh of the same structure, however, coordinates of vertices in the template mesh are different for the different images.

In some embodiments of the disclosure, the parametric face model may include a bilinear face model depending on two parameters, facial identity and facial expression. The bilinear face model can be built based on blend shapes corresponding to the images of individuals. Thus, the parametric face model includes the template mesh of a pre-determined structure, wherein the coordinates of vertices depend on the facial identity and facial expression.

In some embodiments of the disclosure, the texture model 510 can include a linear space of texture vectors corresponding to images of the individuals. The texture vectors can be determined as colors at vertices of the template mesh.

The parametric face model 505 and the texture model 510 can be used to synthesize a face based on known parameters of facial identity, facial expression, and texture. The parametric face model 505 and the texture model 510 can be also used to determine unknown parameters of facial identity, facial expression, and texture based on a new image of a new face.

Synthesis of a face using the parametric face model 505 and the texture model 510 is not time-consuming; however, the synthesized face may not be photorealistic, especially in the mouth and eyes regions. In some embodiments of the disclosure, the DNN 515 can be trained to generate photorealistic images of the mouth and eye regions of a face. The DNN 515 can be trained using a collection of videos of talking individuals. The mouth and eyes regions of talking individuals can be captured from frames of the videos. The DNN 515 can be trained using a generative adversarial network (GAN) to predict the mouth and eyes regions of the face based on a pre-determined number of previous frames of the mouth and eyes regions and desired facial expression of a current frame. The previous frames of the mouth and eyes regions can be extracted at specific moment parameters for facial expression. The DNN 515 may allow synthesizing mouth and eyes regions with desired parameters for facial expression. The DNN 515 may also allow utilizing previous frames to obtain spatial coherence.

The GAN performs the conditioning on mouth and eyes regions rendered from a face model, current expression parameters, and embedding features from previously generated images and produces the same but more photorealistic regions. The mouth and eyes regions generated using the DNN 515 can be used to replace the mouth and eye regions synthesized by the parametric face model 505. It should be noted that synthesizing mouth and eye regions by DNN may be less time-consuming than synthesizing, by a DNN, an entire face. Therefore, generation of mouth and eye regions using DNN can be carried out in real time, by, for example, one or more of processors of a mobile device, such as a smartphone or a tablet.

In some embodiments, the pre-processing module 520 can be configured to receive a pre-generated video 410 and an image of a source face 405. The target video 410 may include a target face. The pre-processing unit 520 can be further configured to perform a segmentation of at least one frame of the target video to obtain images of the target face 415 and a target background. The segmentation can be carried out using neural networks, matting, and smoothing.

In some embodiments, the pre-processing module 520 can be further configured to determine, using the parametric face model 505 and the texture model 510, a set of target face parameters based on at least one frame of the target video 410. In some embodiments, the target parameters may include target facial identity, target facial expression, and target texture. In some embodiments, the pre-processing module 520 may be further configured to determine, using the parametric face model 505 and the texture model 510, a set of source face parameters based on the image of the source face 405. The set of source face parameters may include source facial identity, source facial expression, and source texture.

In some embodiments, the face synthesis module 525 can be configured to replace the source facial expression in the set of source face parameters with the target facial expression to obtain a set of output parameters. The face synthesis module 525 can be further configured to synthesize an output face using the output set of parameters and the parametric face model 505 and texture model 510.

In some embodiments, two-dimensional (2D) deformations can be applied to the target face to obtain photorealistic images of regions of the output face which are hidden in the target face. The parameters of the 2D deformations can be determined based on the source set of parameters of the parametric face model.

In some embodiments, the mouth and eyes generation module 530 can be configured to generate mouth and eyes regions using DNN 515 based on the source facial expression and at least one previous frame of the target video 410. The mouth and eye generation module 530 can be further configured to replace mouth and eyes regions in an output face synthesized with the parametric face model 505 and texture model 510 with mouth and eye regions synthesized with DNN 515.

Figure 6:
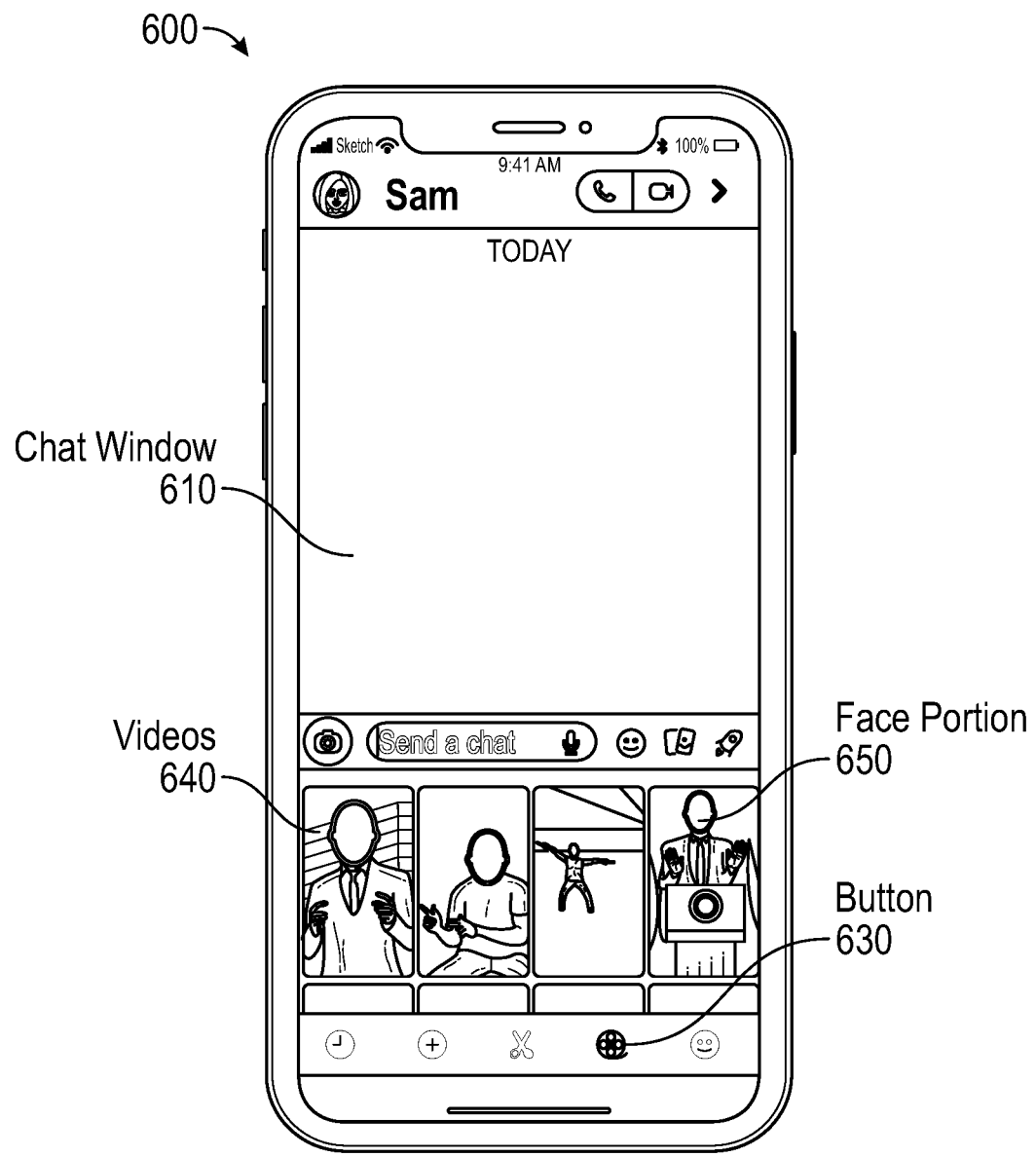

FIG. 6 shows an example screen of a user interface 600 of a system for providing personalized videos in a messaging application (messenger), according to some example embodiments. The user interface 600 may include a chat window 610 and a section containing videos 640. The videos 640 may include a pre-rendered videos with face portions 650 instead of faces. The pre-rendered videos may include teaser videos intended to show the user a sample representation of how the personalized video may look like. The face portions 650 may be shown in the form of white ovals. In some embodiments, the videos 640 may include several face portions 650 to enable creation of multiple-person videos, i.e., videos having faces of multiple persons. A user may tap on any of the videos 640 to select the one of the videos 640 for modifying and sending to the chat window 610. The modification may include receiving a selfie picture from the user (i.e., an image of a user face taken via a front camera of the computing device), obtaining a source face from the selfie picture, and modifying the selected video 640 by using the source face to create a personalized video, also referred herein to as a "Reel". Thus, as used herein, the Reel is a personalized video produced by modifying a video template (a video without a user face) into a video with the user face inserted. Therefore, the personalized video may be generated in the form of an audiovisual media (e.g., a video, an animation, or any other type of media) that features a face of a user. The modified video can be sent to the chat window 610. The user interface 600 may further have a button 630 upon tapping on which the user may be transitioned from the messaging application to the system for providing personalized videos according to the present disclosure and use the functionality of the system.

Figure 7:
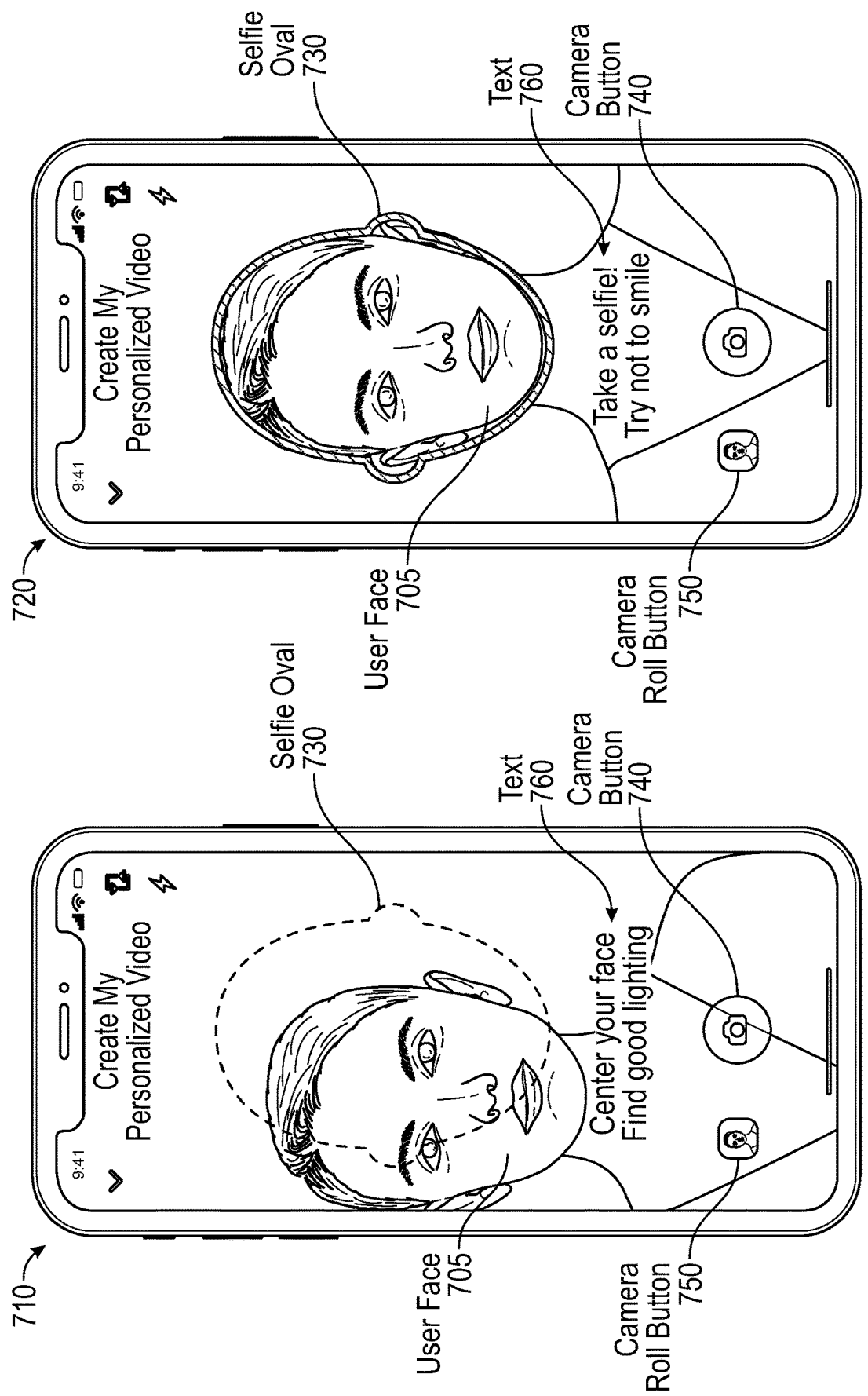

FIG. 7 shows an example screen of user interfaces 710 and 720 of a system for providing personalized videos in a messenger, according to some example embodiments. The user interfaces 710 and 720 show a selfie capturing mode in which a user may take an image of the user face, which is then used as a source face. The user interface 710 shows a live view of a camera of a computing device when the user intends to capture the selfie image. The live view may show the user face 705. The user interface 710 may show a selfie oval 730 and a camera button 740. In an example embodiment, the camera button 740 may slide up from a bottom of the screen in the selfie capturing mode. The user may need to change the position of the camera in order to position the user face 705 within the boundaries of the selfie oval 730. When the user face 705 is not centered in the selfie oval 730, the selfie oval 730 can be styled in the form of a dotted line and the camera button 740 is semi-transparent and not actionable to indicate that the camera button 740 is inactive. To notify the user that the user face is not centered, a text 760 may be displayed below the selfie oval 730. The text 760 may include instructions for the user, e.g., "Center your face," "Find good lighting," and so forth.

The user interface 720 shows a live view of the camera of the computing device after the user changes the position of the camera to capture the selfie image and the user face 705 becomes centered in the selfie oval 730. In particular, when the user face 705 becomes centered in the selfie oval 730, the selfie oval 730 changes to become a bold continuous line and the camera button 740 becomes opaque and actionable to indicate that the camera button 740 is now active. To notify the user, the text 760 may be displayed below the selfie oval 730. The text 760 may instruct the user to make the selfie picture, e.g., "Take a selfie," "Try not to smile," and so forth. In some embodiments, the user may select an existing selfie picture from a picture gallery by pressing a camera roll button 750.

FIG. 8 shows an example screen of user interfaces 810 and 820 of a system for providing personalized videos in a messenger, according to some example embodiments. The user interfaces 810 and 820 are shown on the screen after the user takes a selfie picture. The user interface 810 may show a background 800, a schematic representation 805 of a Reel that is currently being created, and a text 815. The text 815 may include, e.g., "Creating My Reel." The user interface 820 may show a Reel 825 that was created and text portions 830 and 835. The Reel 825 may be shown in a full screen mode. The text 815 may include, e.g., "Your Reel is ready." A dark color gradient may be provided above behind the Reel 825 so the text 830 is visible. The text portion 835 may display, for example, "Use this selfie to send Reels in Chat or retake it to try again" to notify the user that the user may either use the selfie picture already taken by the user or take another selfie picture. Additionally, two buttons may be shown on the user interface 820. A button 840 may be shown with a blue and filled background and may instruct the user to "Use this Selfie." When the user taps the button 840, a two-person Reels screen may be enabled. A button 845 may be shown with a white, outlined, and transparent background and may instruct the user to "Retake Selfie." When the user taps the button 845, the user interface 710 shown on FIG. 7 may be activated and the step of creation of a Reel may be initiated as described with reference to FIG. 7. The user interface 820 may further show a subtext 850 below the buttons 840 and 845. The subtext 850 may inform how the user may delete Reel, e.g., "You can delete your Reels selfie in Settings."

Figure 9:
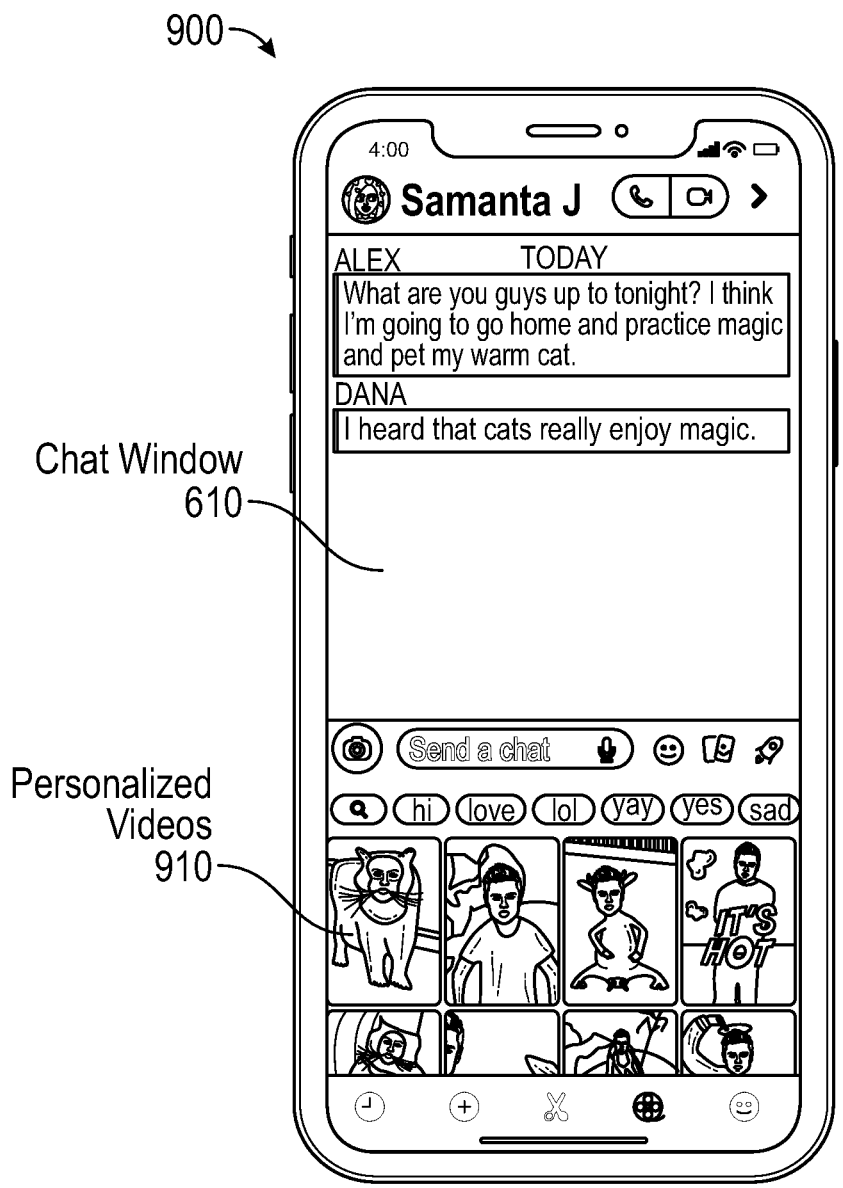

FIG. 9 shows an example screen of a user interface 900 of a system for providing personalized videos in a messenger, according to some example embodiments. The user interface 900 may be shown after the user selects and confirms the selfie picture of the user. The user interface 900 may show a chat window 610 and a Reels section with personalized videos 910. In an example embodiment, personalized videos 910 may be shown in a vertically scrolling list of tiles, with four personalized videos 910 tiles in each row. All personalized videos 910 may autoplay (automatically play back) and loop (play back continuously). Sound may be off in all personalized videos 910 regardless of sound settings of a computing device or tapping a volume button by the user. Similarly to stickers usually used in messengers, the personalized videos 910 may be indexed and searchable.

Figure 10:
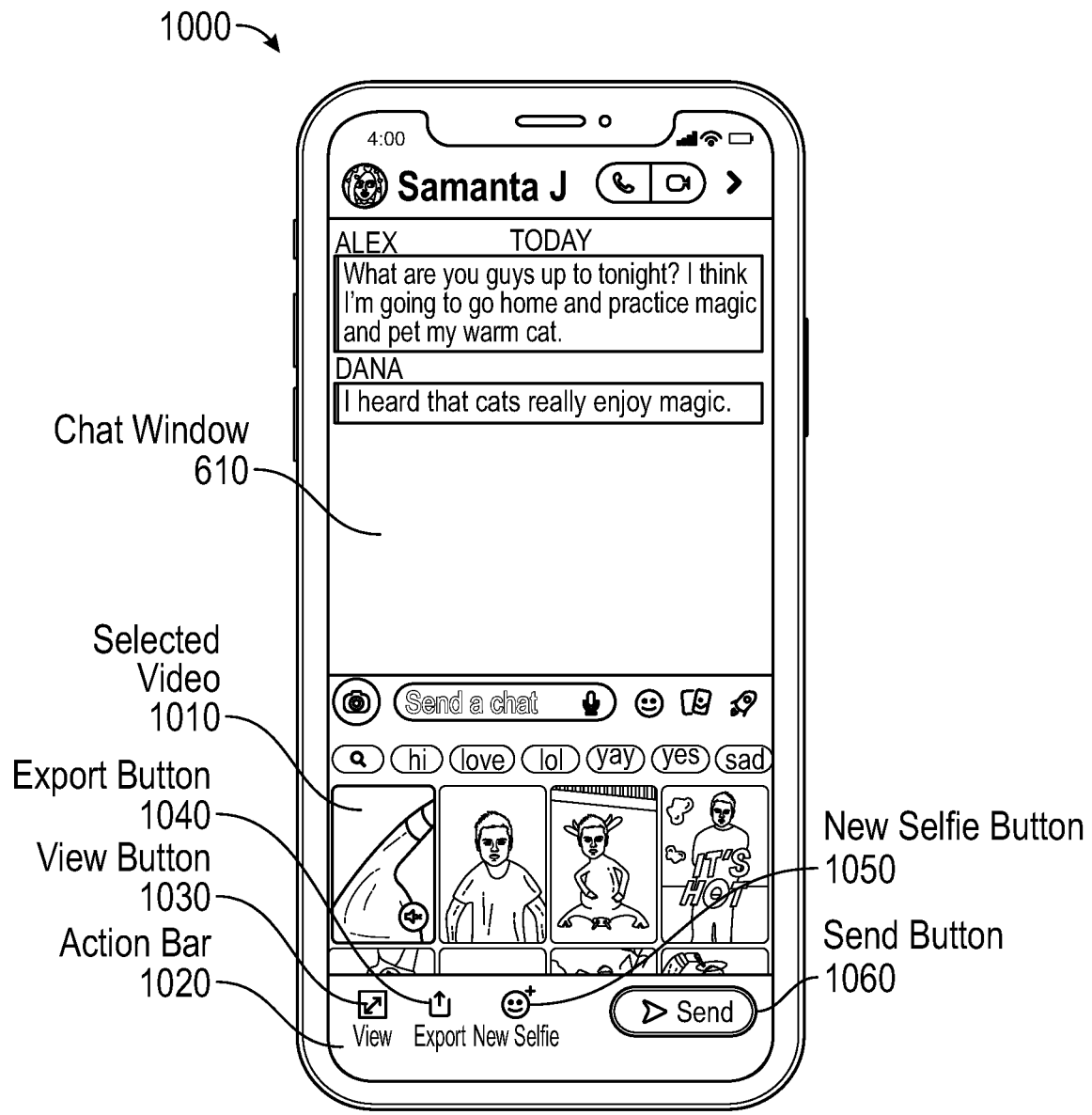

FIG. 10 shows an example screen of a user interface 1000 of a system for providing personalized videos in a messenger, according to some example embodiments. The user interface 1000 may include a chat window 610, a list of personalized videos with selected video 1010, and an action bar 1020. The action bar 1020 may slide up from a bottom of the screen to enable the user to take an action on the selected video 1010. The user may take certain actions on the selected video 1010 from the action bar 1020 via buttons 1030-1060. The button 1030 is a "View" button to enable the user to view the selected video 1010 in a full screen mode. The button 1040 is an "Export" button to enable the user to export the selected video 1010 using another application or save the selected video 1010 to a storage of the computing device. The button 1050 is "New Selfie" button enabling the user to take a new selfie. The button 1060 is "Send" button enabling the user to send the selected video 1010 to the chat window 610.

The user may tap the button 1030 to view the selected video 1010 in a full screen mode. Upon tapping the button 1030, the button 1060 ("Send" button) may stay in place on the action bar 1020 to enable the user to insert the selected video 1010 into the chat window 610. The other buttons may fade when the selected video 1010 is reproduced in the full screen mode. The user may tap the right side of the screen or swipe left/right to navigate between the videos in the full screen mode. The user may move to the next video until the user has completed a row, and then move to the first video in the next row. When the selected video 1010 is shown in the full screen mode, the volume of the selected video 1010 corresponds to volume settings of the computing device. If the volume is on, the selected video 1010 may play with volume. If the volume is off, the selected video 1010 may play with no volume. If the volume is off but the user taps a volume button, the selected video 1010 may play with a volume. The same settings are applied if the user selects a different video, i.e. the selected video may be played with volume. If the user leaves the chat conversation view shown on the user interface 1000, the volume settings of the videos may be reset to correspond to the volume settings of the computing device.

Once the selected video 1010 is sent, both the sender and the recipient can view the selected video 1010 the same way in the chat window 610. The sound of the selected video 1010 may be off when the selected video 1010 is in the collapsed view. The sound of the selected video 1010 may be played only when the selected video 1010 is viewed in a full screen mode.

The user may view the selected video 1010 in the full screen mode and swipe the selected video 1010 down to exit from the full screen mode back to the chat conversation view. The user may also tap a down arrow at top left to dismiss it.

Tapping the button 1040, i.e. the "Export" button, may trigger presenting a share sheet. The user may share the selected video 1010 directly via any other platforms or save it to a picture gallery on the computing device. Some platforms may autoplay videos in chats, others may not autoplay videos. If a platform does not autoplay videos, the selected video 1010 may be exported in Graphics Interchange Format (GIF) format. Some operating systems of computing devices may have a sharing menu that allows selecting which file will be shared to which platform, so there may be no need to add custom action sheets. Some platforms may not play GIF files and display them as static images and the selected video 1010 may be exported as a video into those platforms.

Figure 11:
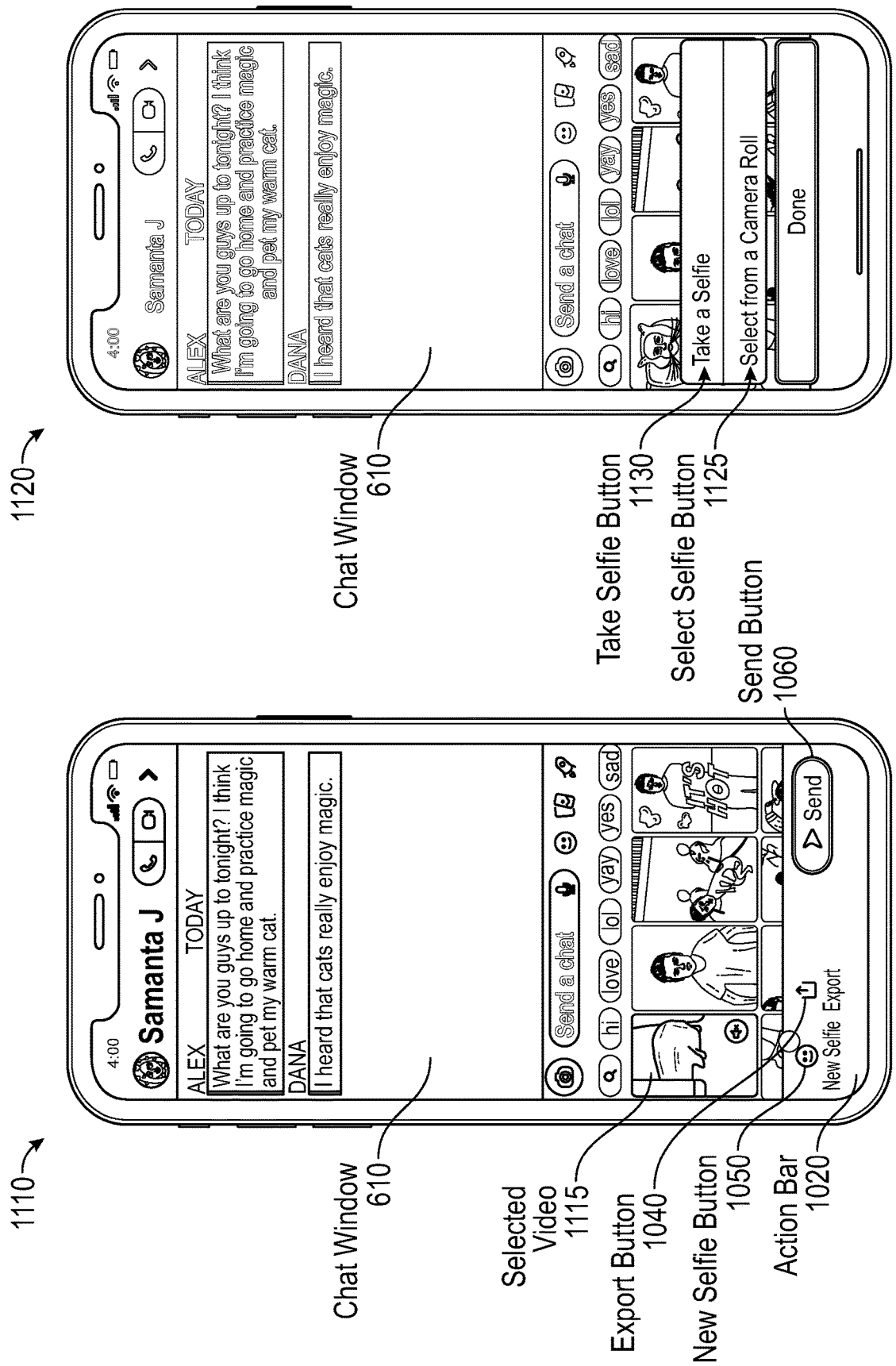

FIG. 11 shows an example screen of user interfaces 1110 and 1120 of a system for providing personalized videos in a messenger, according to some example embodiments. The user interface 1110 may include a chat window 610, a list of personalized videos with selected video 1115, and an action bar 1020. Upon tapping the New Selfie button 1050, the user interface 1120 may be shown. Specifically, when in a video a state is selected as shown on the user interface 1110, the user may tap the New Selfie 1050 to view an action sheet that allows the user to choose whether the user wants to select a selfie from a gallery (via a "Select from Camera Roll" button 1125) or take a new selfie (via a "Take Selfie" button 1130) with a camera of the computing device. Tapping the "Take Selfie" button 1130 may take the user through the process as shown in FIG. 7.

After the user takes the selfie picture with the camera or selects the selfie picture from the Camera Roll, the process shown in FIG. 8 can be initiated. Tapping the "Select Face from Camera Roll" button 1125 takes the user to the selfie pictures on a Camera Roll page, which may slide up from the bottom of the screen on top of the chat window 610. Thereafter, the selfie picture can be positioned in a selfie oval as described with reference to FIG. 7.

When the user receives a Reel for the first time and has not yet created his own Reel, the system may encourage the user to create his own Reel. For example, when the user watches, in a full screen mode, the Reel that the user received from another user, a "Create My Reel" button may be displayed at the bottom of the Reel. The user may tap the button or swipe up on the Reel to bring the camera button onto the screen and enter the mode for taking selfies described in detail with reference to FIG. 7.

In an example embodiment, the Reels may be categorized to let users easily find general sentiments that the users want to convey. A predetermined number of categories for a number of sentiments may be provided, for example, featured, greetings, love, happy, upset, celebration, and so forth. In some example embodiments, search tags can be used instead of the categories.

Figure 12:
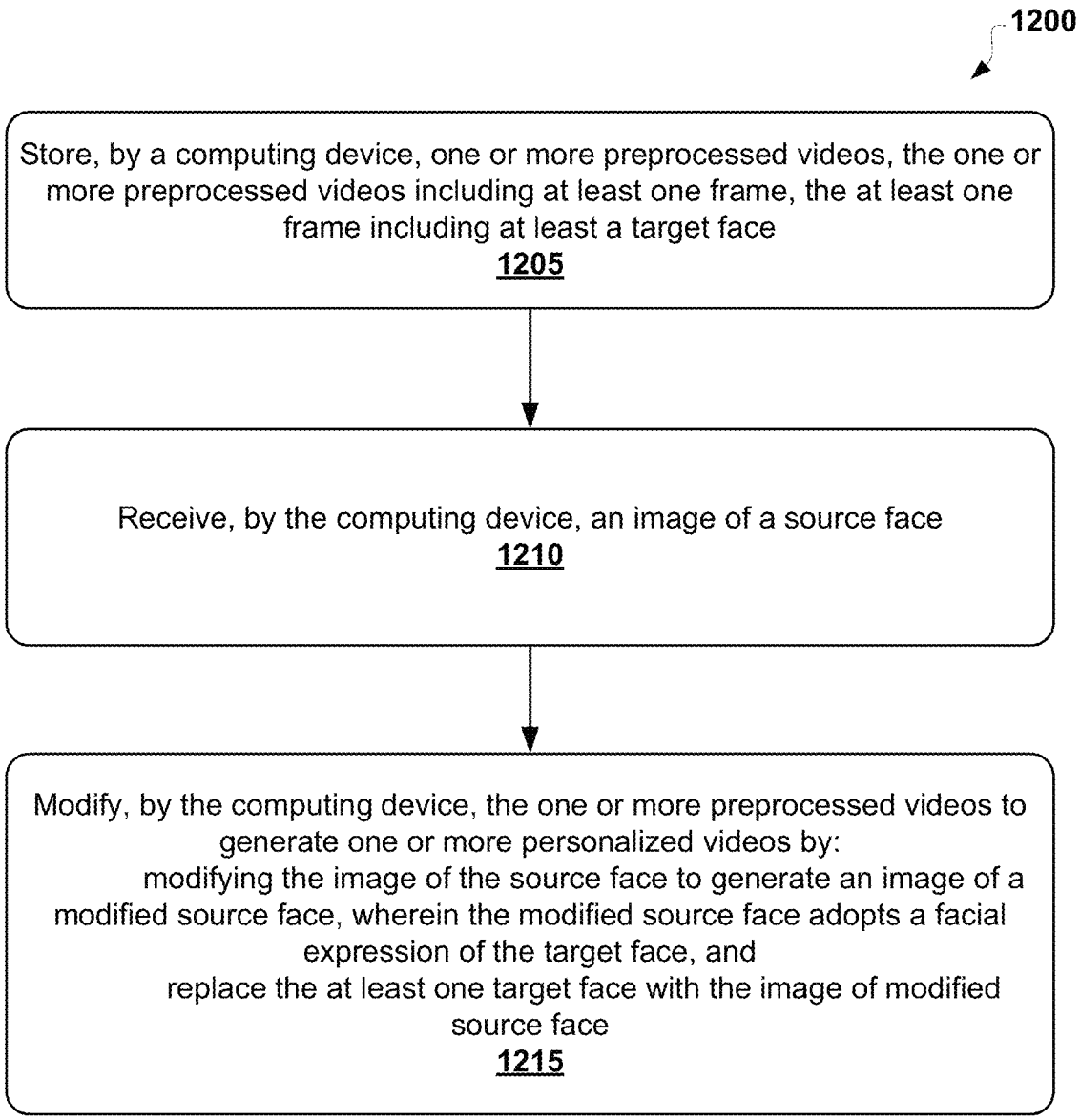
FIG. 12 is a flow chart showing a method for providing personalized videos, in accordance with an example embodiment.

FIG. 12 is a flow chart showing a method 1200 for providing personalized videos, according to an example embodiment. The method 1200 can be performed by computing device 105. The method 1200 may commence in block 1205 with storing, by a computing device, one or more preprocessed videos. The one or more preprocessed videos may include at least one frame. The at least one frame may include at least a target face. The method 1200 may continue with receiving, by the computing device, an image of a source face as shown in block 1210. The method 1200 may further continue at block 1215, where the one or more preprocessed videos may be modified to generate one or more personalized videos. The modification may include modifying the image of the source face to generate an image of a modified source face. The modified source face may adopt a facial expression of the target face. The modification may further include replacing the at least one target face with the image of the modified source face.

Figure 13:
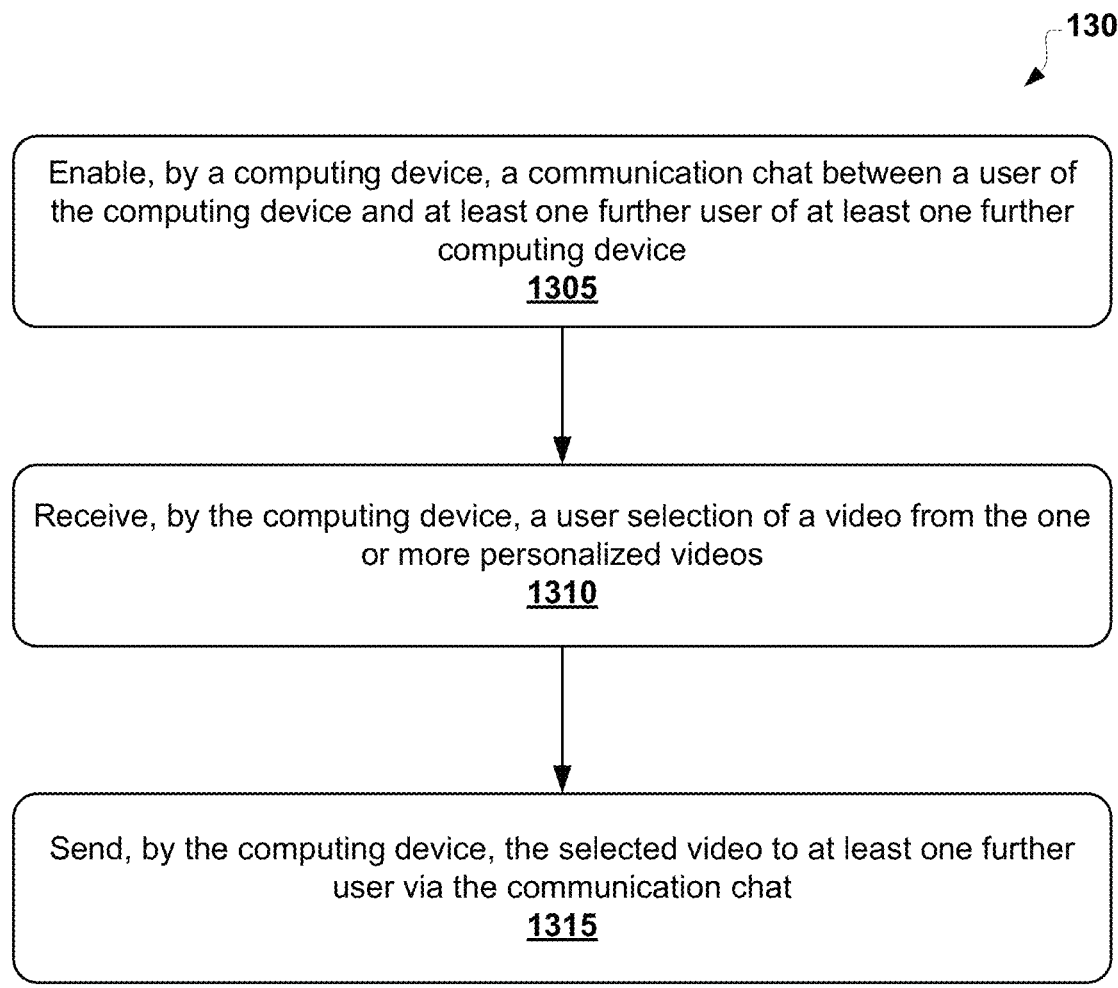
FIG. 13 is a flow chart showing a method for sharing personalized videos, in accordance with an example embodiment.

FIG. 13 is a flow chart showing a method 1300 for sharing the personalized videos, according to some example embodiment of the disclosure. The method 1300 can be performed by the computing device 105. The method 1300 may provide additional steps of the method 1200 of the FIG. 12. The method 1300 may commence in block 1305 with enabling, by a computing device, a communication chat between a user of the computing device and at least one further user of at least one further computing device. The method 1300 may continue in block 1310 with receiving, by the computing device, a user selection of a video from the one or more personalized videos. The method 1300 may further include sending, by the computing device, the selected video to at least one further user via the communication chat as shown in block 1315.

Figure 14:
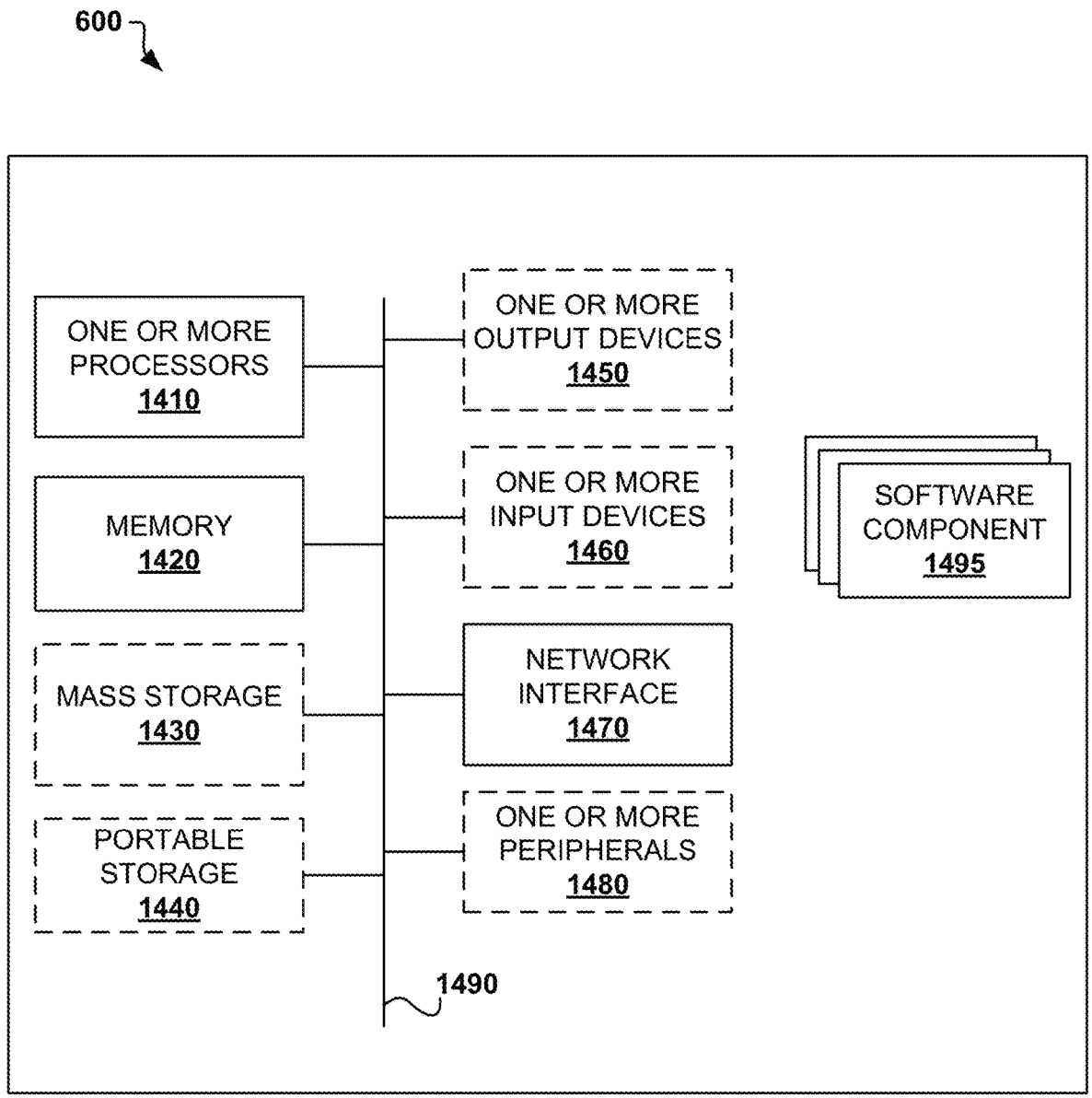
FIG. 14 shows an example computer system that can be used to implement methods for providing personalized videos.

FIG. 14 illustrates an example computing system 1400 that can be used to implement methods described herein. The computing system 1400 can be implemented in the contexts of the likes of computing devices 105 and 110, the messenger services system 130, the messenger 220, and the system 300 for providing personalized videos.

As shown in FIG. 14, the hardware components of the computing system 1400 may include one or more processors 1410 and memory 1420. Memory 1420 stores, in part, instructions and data for execution by processor 1410. Memory 1420 can store the executable code when the system 1400 is in operation. The system 1400 may further include an optional mass storage device 1430, optional portable storage medium drive(s) 1440, one or more optional output devices 1450, one or more optional input devices 1460, an optional network interface 1470, and one or more optional peripheral devices 1480. The computing system 1400 can also include one or more software components 1495 (e.g., ones that can implement the method for providing personalized videos as described herein).

The components shown in FIG. 14 are depicted as being connected via a single bus 1490. The components may be connected through one or more data transport means or data network. The processor 1410 and memory 1420 may be connected via a local microprocessor bus, and the mass storage device 1430, peripheral device(s) 1480, portable storage device 1440, and network interface 1470 may be connected via one or more input/output (I/O) buses.

The mass storage device 1430, which may be implemented with a magnetic disk drive, solid-state disk drive, or an optical disk drive, is a non-volatile storage device for storing data and instructions for use by the processor 1410. Mass storage device 1430 can store the system software (e.g., software components 1495) for implementing embodiments described herein.

Portable storage medium drive(s) 1440 operates in conjunction with a portable non-volatile storage medium, such as a compact disk (CD), or digital video disc (DVD), to input and output data and code to and from the computing system 1400. The system software (e.g., software components 1495) for implementing embodiments described herein may be stored on such a portable medium and input to the computing system 1400 via the portable storage medium drive(s) 1440.

The optional input devices 1460 provide a portion of a user interface. The input devices 1460 may include an alphanumeric keypad, such as a keyboard, for inputting alphanumeric and other information, or a pointing device, such as a mouse, a trackball, a stylus, or cursor direction keys. The input devices 1460 can also include a camera or scanner. Additionally, the system 1400 as shown in FIG. 14 includes optional output devices 1450. Suitable output devices include speakers, printers, network interfaces, and monitors.

The network interface 1470 can be utilized to communicate with external devices, external computing devices, servers, and networked systems via one or more communications networks such as one or more wired, wireless, or optical networks including, for example, the Internet, intranet, LAN, WAN, cellular phone networks, Bluetooth radio, and an IEEE 802.11-based radio frequency network, among others. The network interface 1470 may be a network interface card, such as an Ethernet card, optical transceiver, radio frequency transceiver, or any other type of device that can send and receive information. The optional peripherals 1480 may include any type of computer support device to add additional functionality to the computer system.

The components contained in the computing system 1400 are intended to represent a broad category of computer components. Thus, the computing system 1400 can be a server, personal computer, hand-held computing device, telephone, mobile computing device, workstation, minicomputer, mainframe computer, network node, or any other computing device. The computing system 1400 can also include different bus configurations, networked platforms, multi-processor platforms, and so forth. Various operating systems (OS) can be used including UNIX, Linux, Windows, Macintosh OS, Palm OS, and other suitable operating systems.

Some of the above-described functions may be composed of instructions that are stored on storage media (e.g., computer-readable medium or processor-readable medium). The instructions may be retrieved and executed by the processor. Some examples of storage media are memory devices, tapes, disks, and the like. The instructions are operational when executed by the processor to direct the processor to operate in accord with the invention. Those skilled in the art are familiar with instructions, processor(s), and storage media.

It is noteworthy that any hardware platform suitable for performing the processing described herein is suitable for use with the invention. The terms "computer-readable storage medium" and "computer-readable storage media" as used herein refer to any medium or media that participate in providing instructions to a processor for execution. Such media can take many forms, including, but not limited to, non-volatile media, volatile media, and transmission media. Non-volatile media include, for example, optical or magnetic disks, such as a fixed disk. Volatile media include dynamic memory, such as system random access memory (RAM). Transmission media include coaxial cables, copper wire, and fiber optics, among others, including the wires that include one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-read-only memory (ROM) disk, DVD, any other optical medium, any other physical medium with patterns of marks or holes, a RAM, a PROM, an EPROM, an EEPROM, any other memory chip or cartridge, a carrier wave, or any other medium from which a computer can read.

Various forms of computer-readable media may be involved in carrying one or more sequences of one or more instructions to a processor for execution. A bus carries the data to system RAM, from which a processor retrieves and executes the instructions. The instructions received by the system processor can optionally be stored on a fixed disk either before or after execution by a processor.

Thus, the methods and systems for providing personalized videos have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A method for providing personalized videos, the method comprising:
storing, by a computing device, one or more preprocessed videos, the one or more preprocessed videos including at least one frame, the at least one frame including at least a target face;
displaying one or more further videos, the one or more further videos including the one or more preprocessed videos, wherein the at least a target face is obscured with a geometrical shape;
providing, by the computing device, a user interface enabling a user to select an image of a source face from a set of source images stored in a memory of the computing device;
receiving, by the computing device and via the user interface, a user selection of the image of the source face; and
modifying, by the computing device, the one or more preprocessed videos to generate one or more personalized videos by:
modifying the image of the source face to generate an image of a modified source face, wherein the modified source face adopts a facial expression of the target face; and
replacing the at least one target face with the image of the modified source face, wherein a face texture in the modified source face is replaced with a face texture of the source face; and
displaying the one or more personalized videos.

2. The method of claim 1, wherein the geometrical shape includes a white oval.

3. The method of claim 1, further comprising prior to modifying the one or more preprocessed videos:
   capturing, by a camera of the computing device, a further image; and
   segmenting the further image into a portion including the source face and a background.

4. The method of claim 3, further comprising, prior to capturing the further image:
   displaying, via a graphical display system of the computing device, a live view of the camera; and
   guiding the user to position an image of a face in the live view of the camera within a pre-determined area of the graphical display system.

5. The method of claim 1, further comprising:
   receiving, by the computing device, a further image of a further source face; and
   modifying, by the computing device and based on the further image, the one or more preprocessed videos to generate the one or more further personalized videos.

6. The method of claim 1, further comprising:
   enabling, by the computing device, a communication chat between the user of the computing device and at least one further user of at least one further computing device;
   receiving, by the computing device, a user selection of a video from the one or more personalized videos; and
   sending, by the computing device, the selected video to at least one further user via the communication chat.

7. The method of claim 6, further comprising:
   displaying, by the computing device, the selected video in a window of the communication chat, the selected video being displayed in a collapsed mode; and
   upon receiving, by the computing device, an indication that the user has tapped the selected video in the window of the communication chat, displaying the selected video in a full screen mode.

8. The method of claim 7, further comprising:
   while displaying the selected video in the collapsed mode, muting sound associated with the selected video; and
   while displaying the selected video in the full screen mode, playing back the sound associated with the selected video.

9. The method of claim 1, further comprising, prior to modifying the image of the source face, determining, based on the at least one frame, target facial expression parameters associated with a parametric face model, wherein:
   modifying the image of the source face includes:
      determining, based on the image of the source face, source parameters associated with the parametrical face model, the source parameters including source facial expression parameters, source facial identity parameters, and source facial texture parameters; and
      synthesizing the image of the modified source face based on the parametrical face model and the target facial expression parameters, the source facial identity parameters, and the source facial texture parameters.

10. The method of claim 9, wherein the at least one frame includes metadata, the metadata including the target facial expression parameters.

11. A system for providing personalized videos, the system comprising at least one processor and a memory storing processor-executable codes, wherein the at least one processor is configured to implement the following operations upon executing the processor-executable codes:
   storing, in a memory of a computing device, one or more preprocessed videos, the one or more preprocessed videos including at least one frame, the at least one frame including at least a target face;
   displaying one or more further videos, wherein the one or more further videos include the one or more preprocessed videos, wherein the at least a target face is obscured with a geometrical shape;
   providing, by the computing device, a user interface enabling a user to select an image of a source face from a set of source images stored in a memory of the computing device;
   receiving, by the computing device and via the user interface, a user selection of the image of the source face; and
   modifying the one or more preprocessed videos to generate one or more personalized videos by:
      modifying the image of the source face to generate an image of a modified source face, wherein the modified source face adopts a facial expression of the target face; and
      replacing the at least one target face with the image of the modified source face, wherein a face texture in the modified source face is replaced with a face texture of the source face; and
      displaying the one or more personalized videos.

12. The system of claim 11, wherein the geometrical shape includes a white oval.

13. The system of claim 11, wherein the at least one processor is configured to, prior to the modifying the one or more preprocessed videos:
   capture, by a camera of the computing device, a further image; and
   segment the further image into a portion including the source face and a background.

14. The system of claim 13, wherein the at least one processor is configured to, prior to capturing the further image:
   display, via a graphical display system of the computing device, a live view of the camera; and
   guide the user to position an image of a face in the live view of the camera within a pre-determined area of the graphical display system.

15. The system of claim 11, wherein the at least one processor is configured to:
   receive a further image of a further source; and
   modify, based on the further image, the one or more preprocessed videos to generate the one or more further personalized videos.

16. The system of claim 11, wherein the at least one processor is configured to:
   enable a communication chat between the user and at least one further user of at least one remote computing device;
   receive a user selection of a video from the one or more personalized videos; and
   send the selected video to at least one further user via the communication chat.

17. The system of claim 16, wherein the at least one processor is configured to:
   display the selected video in a window of the communication chat, the selected video being displayed in a collapsed mode; and
   upon receiving an indication that the user has tapped the selected video in the window of the communication chat, display the selected video in a full screen mode.

18. The system of claim 17, wherein the at least one processor is configured to:
- while displaying the selected video in the collapsed mode, mute sound associated with the selected video; and
- while displaying the selected video in the full screen mode, play back the sound associated with the selected video.

19. The system of claim 11, wherein the at least one processor is configured to, prior to modifying the image of the source face, determine, based on the at least one frame, target facial expression parameters associated with a parametric face model; and wherein:
- modifying the image of the source face includes:
  - determining, based on the image of the source face, source parameters associated with the parametrical face model, the source parameters including source facial expression parameters, source facial identity parameters, and source facial texture parameters; and
  - synthesizing the image of the modified source face based on the parametrical face model and the target facial expression parameters, the source facial identity parameters, and the source facial texture parameters.

20. A non-transitory processor-readable medium having instructions stored thereon, which when executed by one or more processors, cause the one or more processors to implement a method for providing personalized videos, the method comprising:
- storing, by a computing device, one or more preprocessed videos, the one or more preprocessed videos including at least one frame, the at least one frame including at least a target face;
- enabling a communication chat between a user and at least one further user of at least one remote computing device;
- displaying one or more further videos, wherein the one or more further videos include the one or more preprocessed videos, wherein the at least a target face is obscured with a geometrical shape;
- providing, by the computing device, a user interface enabling the user to select an image of a source face from a set of source images stored in a memory of the computing device;
- receiving, by the computing device and via the user interface, a user selection of the image of the source face;
- modifying, by the computing device, the one or more preprocessed videos to generate one or more personalized videos by:
  - modifying the image of the source face to generate an image of a modified source face, wherein the modified source face adopts a facial expression of the target face; and
  - replacing the at least one target face with the image of the modified source face, wherein a face texture in the modified source face is replaced with a face texture of the source face;
- displaying the one or more personalized videos;
- receiving a user selection of a video from the one or more personalized videos; and
- sending the selected video to at least one further user via the communication chat.

* * * * *